US012436478B2

(12) United States Patent
Fujita et al.

(10) Patent No.: US 12,436,478 B2
(45) Date of Patent: Oct. 7, 2025

(54) TONER FOR DEVELOPING ELECTROSTATIC CHARGE IMAGE, ELECTROSTATIC CHARGE IMAGE DEVELOPER, TONER CARTRIDGE, PROCESS CARTRIDGE, AND IMAGE FORMING APPARATUS

(71) Applicant: FUJIFILM BUSINESS INNOVATION CORP., Tokyo (JP)

(72) Inventors: Asafumi Fujita, Kanagawa (JP); Yukiaki Nakamura, Kanagawa (JP); Masaru Takahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 734 days.

(21) Appl. No.: 17/412,458

(22) Filed: Aug. 26, 2021

(65) Prior Publication Data

US 2022/0373918 A1 Nov. 24, 2022

(30) Foreign Application Priority Data

May 21, 2021 (JP) ................................ 2021-086313

(51) Int. Cl.

| | |
|---|---|
| ***G03G 9/097*** | (2006.01) |
| ***G03G 9/08*** | (2006.01) |
| ***G03G 9/087*** | (2006.01) |
| ***G03G 15/08*** | (2006.01) |
| ***G03G 21/18*** | (2006.01) |

(52) U.S. Cl.

CPC ....... *G03G 9/09775* (2013.01); *G03G 9/0819* (2013.01); *G03G 9/0825* (2013.01); *G03G 9/08755* (2013.01); *G03G 15/0865* (2013.01); *G03G 21/1814* (2013.01)

(58) Field of Classification Search

CPC ............ G03G 9/09775; G03G 9/0819; G03G 9/0825; G03G 9/08755; G03G 15/0865; G03G 21/1814

See application file for complete search history.

(56) References Cited

U.S. PATENT DOCUMENTS

| | | | | |
|---|---|---|---|---|
| 7,556,905 B2 * | 7/2009 | Yoshida | G03G 9/0975 430/108.4 |
| 2014/0193751 A1 * | 7/2014 | Sugitate | G03G 9/08797 430/107.1 |
| 2018/0059563 A1 * | 3/2018 | Nakamura | G03G 9/0902 |
| 2020/0016073 A1 * | 1/2020 | Hong | A61K 9/7007 |
| 2020/0301296 A1 | 9/2020 | Sriskandha et al. | |
| 2022/0244656 A1 * | 8/2022 | Frank | G03G 9/0918 |

FOREIGN PATENT DOCUMENTS

| | | |
|---|---|---|
| JP | 2013-140216 A | 7/2013 |
| JP | 2018049244 A * | 3/2018 |
| JP | 2020-154295 A | 9/2020 |

OTHER PUBLICATIONS

English machine translation of the description of JP-2018049244-A (Year: 2018).*

Sep. 19, 2024 Office Action issued in Japanese Application No. 2021-086313.

* cited by examiner

*Primary Examiner* — Mark F. Huff
*Assistant Examiner* — Boone Alexander Evans
(74) *Attorney, Agent, or Firm* — Oliff PLC

(57) ABSTRACT

A toner for developing an electrostatic charge image includes toner particles that include a binder resin, a releasing agent, a brilliant pigment, and an aminocarboxylic acid compound.

19 Claims, 2 Drawing Sheets

TONER FOR DEVELOPING ELECTROSTATIC CHARGE IMAGE, ELECTROSTATIC CHARGE IMAGE DEVELOPER, TONER CARTRIDGE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2021-086313 filed May 21, 2021.

BACKGROUND

(i) Technical Field

The present disclosure relates to a toner for developing an electrostatic charge image, an electrostatic charge image developer, a toner cartridge, a process cartridge, and an image forming apparatus.

(ii) Related Art

Japanese Unexamined Patent Application Publication No. 2020-154295 discloses a method for producing a low gloss toner. This method includes: forming an emulsion by mixing a resin, a coloring agent, and a wax in water; heating the emulsion in the presence of a polyion coagulant up to a temperature lower than the glass transition temperature of the resin so as to form aggregated particles composed of the resin, the coloring agent, the charge controller, and the wax; adding, to the resulting heated emulsion, a trisodium dicitrate hydrate in an amount of 0.4 wt % to about 1.0 wt % on the basis of the total weight of the reagent under stirring; forming toner particles having a volume-average particle diameter of 4.3 to 4.9 micrometers by heating the aggregated particles to a temperature higher than the glass transition temperature of the resin; separating the toner particles from water; and drying the obtained particles.

SUMMARY

When an image is formed by using a toner that uses a brilliant pigment, the brilliant pigment in the toner particles may cut into a cleaning blade while the cleaning blade is cleaning the toner remaining after the transfer, and blade chipping may occur. If blade chipping occurs, the toner may pass through the chipped portion of the blade, and color streaks may occur due to the passing-through of the toner.

Aspects of non-limiting embodiments of the present disclosure relate to a toner for developing an electrostatic charge image, with which the passing-through of the toner is suppressed compared to when the toner particles are composed of a binder resin, a releasing agent, and a brilliant pigment.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a toner for developing an electrostatic charge image, the toner including toner particles that include a binder resin, a releasing agent, a brilliant pigment, and an aminocarboxylic acid compound.

BRIEF DESCRIPTION OF THE DRAWINGS

Exemplary embodiments of the present disclosure will be described in detail based on the following figures, wherein.

DETAILED DESCRIPTION

Figure 1:
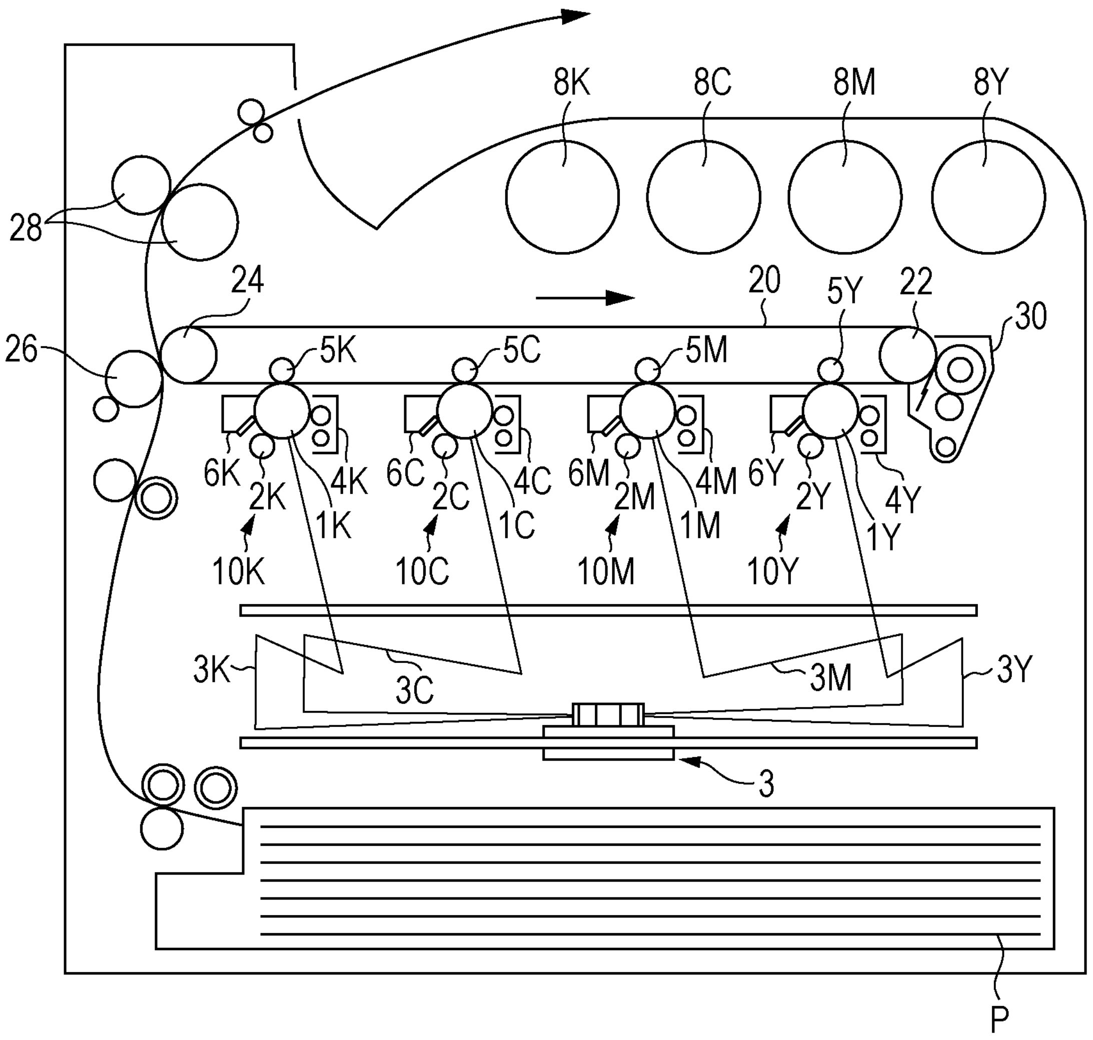
FIG. 1 is a schematic diagram illustrating an image forming apparatus according to an exemplary embodiment.

Hereinafter, exemplary embodiments, which are some examples of the present disclosure, are described. The following descriptions and the examples are merely exemplary and do not limit the scope of the present disclosure.

In numerical ranges described stepwise in the present description, the upper limit or the lower limit of one numerical range may be substituted with an upper limit or a lower limit of a different numerical range also described stepwise. In any numerical range described in the present description, the upper limit or the lower limit of the numerical range may be substituted with a value indicated in Examples.

Each component may contain two or more corresponding substances.

When the amount of a component in the composition is described and when there are two or more substances that correspond to that component in the composition, the amount of that component is the total amount of the two or more substances present in the composition unless otherwise noted.

Toner for Developing Electrostatic Charge Image

A toner for developing an electrostatic charge image (hereinafter, the toner for developing an electrostatic charge image may also be referred to as a "toner") according to an exemplary embodiment contains toner particles that contain a binder resin, a releasing agent, a brilliant pigment, and an aminocarboxylic acid compound.

In this embodiment, passing-through of the toner is suppressed due to the aforementioned features. The exact reason for this is not clear, but is presumably as follows.

The shape of the toner particles that contain a brilliant pigment is flat, and protrusions and recesses tend to occur in a high-curvature region that centers on a line intersection between the flat surface direction and the thickness direction.

In addition, when a transfer voltage is applied to flat toner particles, the long axis of a toner particle orients in a direction parallel to the electric field, in other words, a direction near perpendicular to the toner image. This orientation is maintained in the toner particles that remain after the transfer.

For example, when a toner image on an intermediate transfer body is subjected to second transfer onto a recording medium, the long axis of the toner particle orients in a direction near perpendicular to the surface of the intermediate transfer body due to application of second transfer voltage. For example, the toner particles that remain on the intermediate transfer body after the second transfer of the toner image from the intermediate transfer body to the recording medium also have their long axes orienting in a direction near perpendicular to the surface of the intermediate transfer body.

When a cleaning step is performed in such a state, one end of the remaining toner particle in a long axis direction collides with a tip (hereinafter, may also be referred to as a "blade end") of the cleaning blade. When a high-curvature region in the surface of the toner particle has protrusions and recesses, the brilliant pigment penetrates through the binder resin, contacts the blade end, and cuts into the blade end. As a result, the blade end becomes chipped, and color streaks attributable to passing-through of the toner may be generated.

To address this issue, in this exemplary embodiment, the toner particles contain an aminocarboxylic acid compound. The presence of the aminocarboxylic acid compound in the binder resin increases the mechanical strength against instantaneous impact. For example, in toner particles produced by an aggregation and coalescence method, the aminocarboxylic acid compound is present between the resin particles during the production process and the particles are thereby coalesced in a firmly aggregated state. The reason for this is not exactly clear, but it is assumed that a structure having a particular angle is formed due to the presence of amino groups in the aminocarboxylic acid compound while the carboxy groups therein adsorb to the resin particles, and due to this structure, resin particles having complicated three dimensional structures aggregate firmly. In particular, the density of the binder resin is high near the surface where the aminocarboxylic acid compound is likely to be present, and thus toner particles having high mechanical strength are obtained. Presumably thus, even when the toner particles collide with the blade end while the long axes of the toner particles are oriented nearly perpendicularly, exposure of the brilliant pigment is suppressed, chipping of the blade end is suppressed, and the passing-through of the toner is suppressed. Suppression of the passing-through of the toner also suppresses color streaks attributable to the passing-through of the toner.

Presumably due to the aforementioned reasons, the toner for developing an electrostatic charge image according to this exemplary embodiment suppresses the passing-through of the toner.

It is to be noted that "flat" refers to a shape that has a flat surface, in which the projected equivalent circle diameter (hereinafter may also be referred to as the "equivalent circle diameter") at the flat surface is larger than the maximum value (hereinafter may also be referred to as the "maximum thickness") of the thickness perpendicular to the flat surface.

The "flat surface" refers to a surface that has the largest projected area.

Next, a toner according to an exemplary embodiment is described in detail.

The toner according to this exemplary embodiment contains toner particles and, if necessary, an external additive.

Toner Particles

The toner particles contain at least a binder resin, a releasing agent, a brilliant pigment, and an aminocarboxylic acid compound, and if necessary may additionally contain a coloring agent other than the brilliant pigment, other additives, etc.

Binder Resin

Examples of the binder resin include vinyl resins such as homopolymers obtained from monomers such as styrenes (for example, styrene, parachlorostyrene, and $\alpha$-methylstyrene), (meth)acrylates (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (for example, acrylonitrile and methacrylonitrile), vinyl ethers (for example, vinyl methyl ether and vinyl isobutyl ether), vinyl ketones (for example, vinyl methyl ketone, vinyl ethyl ketone, and vinyl isopropenyl ketone), and olefins (for example, ethylene, propylene, and butadiene), and copolymers obtained from a combination of two or more of these monomers.

Other examples of the binder resin include non-vinyl resins such as epoxy resins, polyester resins, polyurethane resins, polyamide resins, cellulose resins, polyether resins, and modified rosin, mixtures of these non-vinyl resins and the aforementioned vinyl resins, and graft polymers obtained by polymerizing a vinyl monomer in the presence of these resins.

These binder resins may be used alone or in combination.

The binder resin can be a polyester resin.

The binder resin containing a polyester resin further suppresses the passing-through of the toner. The reason for this is not clear, but, presumably, since hydrophilic groups at the polyester resin terminals easily adsorb onto carbonyl groups in the aminocarboxylic acid compound, the aminocarboxylic acid compound present between the particles of the binder resin enhances the aggregating properties of the binder resin particles, and thus the binder resin density and the mechanical strength are increased.

Examples of the polyester resin include known polyester resins.

Examples of the polyester resin include polycondensation products between polycarboxylic acids and polyhydric alcohols. A commercially available polyester resin or a synthesized polyester resin may be used as the polyester resin.

Examples of the polycarboxylic acids include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (for example, cyclohexanedicarboxylic acid), aromatic dicarboxylic acids (for example, terephthalic acid, isophthalic acid, phthalic acid, and naphthalenedicarboxylic acid), anhydrides thereof, and lower (for example, 1 to 5 carbon atoms) alkyl esters thereof. Among these, aromatic dicarboxylic acids can be used as polycarboxylic acids, for example.

A dicarboxylic acid and a tri- or higher carboxylic acid having a crosslinked structure or a branched structure may be used in combination as the polycarboxylic acid. Examples of the tri- or higher carboxylic acid include trimellitic acid, pyromellitic acid, anhydrides thereof, and lower(for example, 1 to 5 carbon atoms) alkyl esters thereof.

These polycarboxylic acids may be used alone or in combination.

Examples of the polyhydric alcohols include aliphatic diols (for example, ethylene glycol, diethylene glycol, triethylene glycol, propylene glycol, butanediol, hexanediol, and neopentyl glycol), alicyclic diols (for example, cyclohexanediol, cyclohexanedimethanol, and hydrogenated bisphenol A), and aromatic diols (for example, ethylene oxide adducts of bisphenol A and propylene oxide adducts of bisphenol A). Among these, for example, aromatic diols and alicyclic diols are preferred, and aromatic diols are more preferred as the polyhydric alcohols.

A trihydric or higher alcohol having a crosslinked structure or a branched structure may be used in combination with a diol as the polyhydric alcohol. Examples of the trihydric or higher alcohol include glycerin, trimethylolpropane, and pentaerythritol.

These polyhydric alcohols may be used alone or in combination.

The glass transition temperature (Tg) of the polyester resin is preferably 50° C. or higher and 80° C. or lower and more preferably 50° C. or higher and 65° C. or lower.

The glass transition temperature is determined from a DSC curve obtained by differential scanning calorimetry (DSC), more specifically, according to "extrapolated glass transition onset temperature" described in the method for determining the glass transition temperature in JIS K 7121: 1987 "Testing Methods for Transition Temperatures of Plastics".

The weight average molecular weight (Mw) of the polyester resin is preferably 5000 or more and 1000000 or less and more preferably 7000 or more and 500000 or less.

The number average molecular weight (Mn) of the polyester resin can be 2000 or more and 100000 or less.

The molecular weight distribution Mw/Mn of the polyester resin is preferably 1.5 or more and 100 or less and more preferably 2 or more and 60 or less.

The weight average molecular weight and the number average molecular weight are measured by gel permeation chromatography (GPC). The molecular weight measurement by GPC is conducted by using GPC HLC-8120GPC produced by TOSOH CORPORATION as a measuring instrument with columns, TSKgel Super HM-M (15 cm) produced by TOSOH CORPORATION, and a THF solvent. The weight average molecular weight and the number average molecular weight are calculated from the measurement results by using the molecular weight calibration curves obtained from monodisperse polystyrene standard samples.

The polyester resin is obtained by a known production method. Specifically, the polyester resin is obtained by a method that involves, for example, setting the polymerization temperature to 180° C. or higher and 230° C. or lower, depressurizing the inside of the reaction system as necessary, and performing reaction while removing water and alcohol generated during the condensation.

When the monomers of the raw materials do not dissolve or mix at the reaction temperature, a high-boiling-point solvent may be added as a dissolving aid. In such a case, the polycondensation reaction is performed while distilling away the dissolving aid. When a poorly compatible monomer is present, that monomer may be subjected to condensation with an acid or alcohol for the condensation in advance, and then subjected to polycondensation with other component.

The binder resin content relative to the entire toner particles is, for example, preferably 40 mass % or more and 95 mass % or less, more preferably 50 mass % or more and 90 mass % or less, and yet more preferably 60 mass % or more and 85 mass % or less.

Releasing Agent

Examples of the releasing agent include hydrocarbon wax; natural wax such as carnauba wax, rice wax, and candelilla wax; synthetic or mineral or petroleum wax such as montan wax; and ester wax such as fatty acid esters and montanic acid esters. The releasing agent is not limited to these.

The melting temperature of the releasing agent is preferably 50° C. or higher and 110° C. or lower and more preferably 60° C. or higher and 100° C. or lower.

The melting temperature is determined from a DSC curve obtained by differential scanning calorimetry (DSC) by the method described in "Melting peak temperature", which is one method for determining the melting temperature in JIS K 7121-1987 "Testing Methods for Transition Temperatures of Plastics".

The releasing agent content relative to the entire toner particles is, for example, preferably 1 mass % or more and 20 mass % or less and more preferably 5 mass % or more and 15 mass % or less.

Brilliant Pigment

Examples of the brilliant pigment include metal pigments such as aluminum, brass, bronze, nickel, stainless steel, and zinc; mica coated with titanium oxide, yellow iron oxide, or the like; flakey or plate crystals such as aluminosilicate, basic carbonates, barium sulfate, titanium oxide, and bismuth oxychloride; and flaky glass powder and metal-deposited flaky glass powder. Among these, metal pigments are preferable from the viewpoint of mirror reflection intensity, and flat-shape metal pigments are more preferable since they offer higher mirror reflection intensity. Among metal pigments, aluminum pigments are preferable from the viewpoint of ease of obtaining flat particle powder. The surfaces of metal pigments may be covered with silica, an acrylic resin, a polyester resin, or the like.

The volume average particle diameter of the brilliant pigment is preferably 3 μm or more and 20 μm or less, more preferably 4.5 μm or more and 18 μm or less, and yet more preferably 6 μm or more and 16 μm or less.

The volume average particle diameter of the brilliant pigment is measured by using Coulter Multisizer II (produced by Beckman Coulter Inc.) with ISOTON-II (produced by Beckman Coulter Inc.) as the electrolyte.

In measurement, 0.5 mg or more and 50 mg or less of a measurement sample is added to 2 mL of a 5 mass % aqueous solution of a surfactant (for example, sodium alkyl benzenesulfonate) serving as the dispersing agent. The resulting mixture is added to 100 mL or more and 150 mL or less of the electrolyte.

The electrolyte in which the sample has been suspended is dispersed for 1 minute with an ultrasonic disperser, and the particle size distribution of the particles having a particle diameter in the range of 2 μm or more and 60 μm or less is measured by using Coulter Multisizer II with an aperture having a diameter of 100 μm. Here, the number of particles sampled is 50000.

A cumulative distribution of the volume is plotted from the small diameter size relative to the particle size ranges (channels) split on the basis of the particle size distribution to be measured, and the particle diameter at 50% accumulation is defined as a volume average particle diameter $D_{50v}$.

Note that the volume-average particle diameter of the brilliant pigment in the toner is measured by the aforementioned method after components other than the brilliant pigment have been removed.

The brilliant pigment content in the toner particles relative to 100 parts by mass of the binder resin is preferably 1 part by mass or more and 70 parts by mass or less and more preferably 5 parts by mass or more and 50 parts by mass or less.

Aminocarboxylic Acid Compound

The aminocarboxylic acid compound may be any compound that has amino and carboxy groups.

Examples of the amino group in the aminocarboxylic acid compound include a primary amino group, a secondary amino group, and a tertiary amino group. The aminocarboxylic acid compound preferably contains a tertiary amino group, and more preferably, all of the amino groups in the aminocarboxylic acid compound are tertiary amino groups.

The number of amino groups in the aminocarboxylic acid compound may be one or more, is preferably 2 or more, is more preferably 2 or more and 4 or less, is yet more preferably 2 or more and 3 or less, and is particularly preferably 2. When the number of amino groups in the aminocarboxylic acid compound is within the aforementioned range, the passing-through of the toner is suppressed compared when the number of the amino groups is below the aforementioned range. In addition, there is an advantage in that, when the number of amino groups in the aminocarboxylic acid compound is within the aforementioned range, generation of the toner coarse particles caused by excessive aggregation force is suppressed compared to when the number of the amino groups is beyond the aforementioned range.

The number of carboxy groups in the aminocarboxylic acid compound may be one or more, is preferably 2 or more, is more preferably 3 or more and 5 or less, is yet more preferably 4 or more and 5 or less, and is particularly preferably 4. When the number of carboxy groups in the aminocarboxylic acid compound is within the aforementioned range, the passing-through of the toner is suppressed compared when the number of the carboxy groups is below the aforementioned range. In addition, when the number of carboxy groups in the aminocarboxylic acid compound is within the aforementioned range, fogging caused by aggregation of the toner particles is suppressed compared when the number of the carboxy groups is beyond the aforementioned range.

The carboxy groups in the aminocarboxylic acid compound may form a salt with an alkali metal ion, an alkaline earth metal ion, an organic cation, or the like. In other words, the aminocarboxylic acid compound may be an aminocarboxylic acid in which no carboxy groups form salts or may be an aminocarboxylate in which carboxy groups in aminocarboxylic acid form salts; and an aminocarboxylate is preferable as the aminocarboxylic acid compound.

Examples of the aminocarboxylate include sodium aminocarboxylate, potassium aminocarboxylate, calcium aminocarboxylate, magnesium aminocarboxylate, aluminum aminocarboxylate, and ammonium aminocarboxylate.

When the aminocarboxylic acid compound has two or more amino groups, examples of the linking group that link the two or more amino groups include an alkylene group, a carbonyl group, and a divalent or higher linking group combining these. The number of carbon atoms in the alkylene group linking two or more amino groups is preferably 1 or more and 4 or less, more preferably 1 or more and 2 or less, and yet more preferably 2.

Examples of the linking group that links the amino group and the carboxy group include an alkylene group, a carbonyl group, and a divalent or higher linking group combining these. The number of carbon atoms in the alkylene group linking the amino group and the carboxy group is preferably 1 or more and 4 or less, more preferably 1 or more and 2 or less, and yet more preferably 1.

The aminocarboxylic acid compound may further contain other substituents in addition to the amino groups and the carboxy groups. Examples of the other substituents include an alkyl group, a hydroxy group, a phenyl group, and a monovalent group combining these.

Specific examples of the aminocarboxylic acid compound include ethylenediaminetetraacetic acid (EDTA), hydroxyethylethylenediaminetriacetic acid (HEDTA), diethylenetriaminepentaacetic acid (DTPA), 1,4,7,10-tetraazacyclododecane-1,4,7,10-tetrayltetraacetic acid (DOTA), L-asparagine monohydrate, triethylenetetraminehexacetic acid (TTHA), nitrilotriacetic acid (NTA), 3-hydroxy-2,2'-iminodisuccinic acid (HIDS), N-(2,6-dimethylphenylcarbamoylmethyl)iminodiacetic acid, and salts thereof.

The molecular weight of the aminocarboxylic acid compound is, for example, in the range of 100 or more and 1000 or less, and is preferably in the range of 150 or more and 800 or less and more preferably in the range of 200 or more and 500 or less from the viewpoint of aggregation force between the binder resin particles.

The pH of the aminocarboxylic acid compound is, for example, 4 or more and 12, and is preferably 5 or more and 8 or less and more preferably 6 or more and 7.5 or less. When the pH of the aminocarboxylic acid compound is within the aforementioned range, the aforementioned effects of the aminocarboxylic acid compound can be easily obtained and the passing-through of the toner is suppressed compared when the pH is beyond the aforementioned range. Meanwhile, when the pH of the aminocarboxylic acid compound is within the aforementioned range, fogging caused by coarse particles generated by excessive aggregation force during coalescing is suppressed compared when the pH of the aminocarboxylic acid compound is below the aforementioned range.

Here, the pH of the aminocarboxylic acid compound is measured as follows.

Specifically, a measurement sample is prepared by dissolving the aminocarboxylic acid compound to be measured in ultrapure water to a concentration of 1%. Then the pH of the measurement sample is measured with any commercially available pH meter, and the observed value is assumed to be the pH of the aminocarboxylic acid compound.

Note that when the pH of the aminocarboxylic acid compound contained in the toner particles is to be measured, 1 g of the toner is weighed, 20 mL of tetrahydrofuran (THF) is added thereto, and the resulting mixture is ultrasonically treated for 15 minutes. Then 60 mL of acetonitrile is added thereto, the resulting mixture is left to stand still for 60 minutes and then centrifugally separated under conditions of 20000 rpm/4° C./30 minutes, and the supernatant is taken. The supernatant is filtered through a 0.2 μm filter, and 0.1 mL of octylphenol is added to prepare a measurement sample. The obtained measurement sample is analyzed with a liquid chromatography mass spectrometer (LCMS-IT-TOF produced by Shimadzu Corporation). The structure of the aminocarboxylic acid compound contained in the toner is identified from the obtained peak intensity and by curve fitting. The aminocarboxylic acid compound identified by this technique is prepared by any method, a 1% aqueous solution is prepared as described above, and the pH obtained by measuring the pH of this 1% aqueous solution with any commercially available pH meter is assumed to be the pH of the aminocarboxylic acid compound.

The aminocarboxylic acid compound content relative to the entire toner is preferably 1 ppm or more and 100 ppm or less, more preferably 10 ppm or more and 80 ppm or less, and yet more preferably 30 ppm or more and 60 ppm or less. When the aminocarboxylic acid compound content is within the aforementioned range, the aforementioned effects of the aminocarboxylic acid compound can be easily obtained and the passing-through of the toner is suppressed compared when the content is below the aforementioned range. Meanwhile, when the aminocarboxylic acid compound content is within the aforementioned range, fogging caused by coarse particles generated by excessive aggregation force during coalescing is suppressed compared when the aminocarboxylic acid compound content is beyond the aforementioned range.

Here, the aminocarboxylic acid compound content in the toner is determined by the aforementioned pH measuring operation.

Specifically, 1 g of the toner is weighed, 20 mL of tetrahydrofuran (THF) is added thereto, and the resulting mixture is ultrasonically treated for 15 minutes. Then 60 mL of acetonitrile is added thereto, the resulting mixture is left to stand still for 60 minutes and then centrifugally separated under conditions of 20000 rpm/4° C./30 minutes, and the supernatant is taken. The supernatant is filtered through a 0.2 μm filter, and 0.1 mL of octylphenol is added to prepare a measurement sample.

The obtained measurement sample is analyzed with a liquid chromatography mass spectrometer (LCMS-IT-TOF produced by Shimadzu Corporation). The structure and the content of the aminocarboxylic acid compound contained in the toner are identified from the obtained peak intensity and by curve fitting.

Coloring Agent Other than Brilliant Pigment

Examples of the coloring agent other than the brilliant pigment include various pigments such as carbon black, chrome yellow, hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and dyes such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

These coloring agents other than the brilliant pigment may be used alone or in combination.

The coloring agent other than the brilliant pigment may be surface-treated as necessary, or may be used in combination with a dispersing agent. Multiple coloring agents may be used in combination.

The amount of the coloring agent other than the brilliant pigment relative to the entire toner particles is, for example, preferably 1 mass % or more and 30 mass % or less and more preferably 3 mass % or more and 15 mass % or less.

Other Additives

Examples of other additives include known additives such as magnetic materials, charge controllers, and inorganic powders. These additives are contained in the toner particles as internal additives.

Properties and Other Features of Toner Particles

The toner particles may have a single layer structure or a core-shell structure each constituted by a core (core particle) and a coating layer (shell layer) covering the core (core-shell particles).

Here, a toner particle having a core-shell structure may be constituted by, for example, a core that contains a binder resin, a releasing agent, a brilliant pigment, and, if necessary, other additives such as a coloring agent other than the brilliant pigment, and a coating layer that contains a binder resin.

The volume average particle diameter (D50v) of the toner particles is preferably 2 μm or more and 12 μm or less and more preferably 4 μm or more and 11 μm or less.

Various average particle diameters and particle size distribution indices of the toner particles are measured by using Coulter Multisizer II (produced by Beckman Coulter Inc.) with ISOTON-II (produced by Beckman Coulter Inc.) as the electrolyte.

In measurement, 0.5 mg or more and 50 mg or less of a measurement sample is added to 2 mL of a 5% aqueous solution of a surfactant (for example, sodium alkyl benzenesulfonate) serving as the dispersing agent. The resulting mixture is added to 100 mL or more and 150 mL or less of the electrolyte.

The electrolyte in which the sample has been suspended is dispersed for 1 minute with an ultrasonic disperser, and the particle size distribution of the particles having a particle diameter in the range of 2 μm or more and 60 μm or less is measured by using Coulter Multisizer II with an aperture having a diameter of 100 μm. Here, the number of particles sampled is 50000.

Cumulative distributions of the volume and number are each plotted from the small diameter size relative to the particle size ranges (channels) split on the basis of the particle size distribution to be measured, and the particle diameter at 16% accumulation is defined as a volume particle diameter D16v and a number particle diameter D16p, the particle diameter at 50% accumulation is defined as a volume average particle diameter D50v and a number average particle diameter D50p, and the particle diameter at 84% accumulation is defined as a volume particle diameter D84v and a number particle diameter D84p.

From these values, the volume particle size distribution index (GSDv) is calculated as $(D84v/D16v)^{1/2}$ and the number particle size distribution index (GSDp) is calculated as $(D84p/D16p)^{1/2}$.

From the viewpoint of obtaining a highly brilliant image, the toner particles can be flat. That is, each of the toner particles can have a flat surface, and the projected equivalent circle diameter (in other words, the "equivalent circle diameter") at the flat surface can be larger than the maximum value (in other words, the "maximum thickness") of the thickness perpendicular to the flat surface.

The ratio C/D of the average maximum thickness C of the toner particles to the average equivalent circle diameter D is preferably in the range of 0.001 or more and 0.500 or less, more preferably in the range of 0.010 or more and 0.200 or less, and yet more preferably in the range of 0.050 or more and 0.100 or less.

When the ratio C/D is 0.001 or more, the strength of the toner particles is ensured, rupture caused by stress during image formation is suppressed, and degradation of charging caused by exposure of the brilliant pigment and fogging resulting therefrom are suppressed. Meanwhile, at a ratio C/D of 0.500 or less, excellent brilliance is obtained.

The aforementioned average maximum thickness C and the average equivalent circle diameter D are measured by the following methods.

The toner is placed on a flat and smooth surface and vibrated to be dispersed evenly. For 1,000 brilliant toner particles, each particle is enlarged by a factor of 1000 with a color laser microscope "VK-9700" (produced by made by KEYENCE CORPORATION), and the maximum thickness C and the equivalent circle diameter D at the surface as viewed from above are measured therefrom, and the arithmetic means are calculated to determine C and D.

An example of adjusting the ratio C/D to be within the aforementioned range for the toner particles produced by an aggregation and coalescence method is a method that involves controlling the ratio C/D by adjusting the stirring conditions in the aggregation step. Specifically, for example, at the stage where the aggregated particles are being formed, high-speed stirring and heating decrease the ratio C/D, and low-speed stirring and heating at low temperature increase the ratio C/D.

External Additive

An example of the external additive is inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$, and $MgSO_4$.

The surfaces of the inorganic particles used as an external additive may be hydrophobized. Hydrophobizing involves, for example, dipping inorganic particles in a hydrophobizing agent. The hydrophobizing agent is not particularly limited, and examples thereof include a silane coupling agent, a silicone oil, a titanate coupling agent, and an aluminum coupling agent. These may be used alone or in combination.

The amount of the hydrophobizing agent is usually, for example, 1 part by mass or more and 10 parts by mass or less relative to 100 parts by mass of the inorganic particles.

Examples of the external additive also include resin particles (resin particles of polystyrene, polymethyl methacrylate (PMMA), melamine resin, and the like) and cleaning active agents (for example, particles of higher aliphatic acid metal salts such as zinc stearate and fluorine polymers).

The external addition amount of the external additive is, for example, preferably 0.01 mass % or more and 5 mass % or less and more preferably 0.01 mass % or more and 2.0 mass % or less relative to the toner particles.

Method for Producing Toner

Next, a method for producing the toner according to an exemplary embodiment is described.

The toner according to this exemplary embodiment is obtained by producing toner particles and then externally adding an external additive to the toner particles.

The toner particles may be produced by a dry method (for example, a kneading and crushing method) or a wet method (for example, an aggregation and coalescence method, a suspension polymerization method, or a dissolution and suspension method). The method for producing the toner particles is not limited to these methods, and any known method is employed.

Among these methods, the aggregation and coalescence method may be used to obtain the toner particles.

Specifically, for example, when the toner particles are to be produced by the aggregation and coalescence method, the toner particles are produced through a step of preparing a resin particle dispersion containing resin particles that serve as a binder resin dispersed therein (resin particle dispersion preparation step), a step of aggregating the resin particles (if necessary, other particles as well) in the resin particle dispersion (if necessary, in a dispersion prepared by mixing a dispersion of other particles) so as to form aggregated particles (aggregated particle forming step), and a step of heating the aggregated particle dispersion containing the dispersed aggregated particles so as to fuse and coalesce the aggregated particles to form toner particles (aggregation and coalescence step).

Hereinafter, the respective steps are described in detail.

Although a method for obtaining toner particles containing a brilliant pigment and a releasing agent is described below, other additives may be used as necessary.

Resin Particle Dispersion Preparation Step

First, in addition to a resin particle dispersion in which resin particles that serve as a binder resin are dispersed, a brilliant pigment dispersion containing a dispersed brilliant pigment and a releasing agent particle dispersion containing dispersed releasing agent particles are prepared, for example.

Here, the resin particle dispersion is prepared by, for example, dispersing resin particles in a dispersion medium by using a surfactant.

Examples of the dispersion medium used in the resin particle dispersion include water-based media.

Examples of the water-based media include water such as distilled water and ion exchange water, and alcohols. These may be used alone or in combination.

Examples of the surfactant include anionic surfactants such as sulfate surfactants, sulfonate surfactants, phosphate surfactants, and soap surfactants; cationic surfactants such as amine salt surfactants and quaternary ammonium salt surfactants; and nonionic surfactants such as polyethylene glycol surfactants, alkyl phenol ethylene oxide adduct surfactants, and polyhydric alcohol surfactants. Among these, an anionic surfactant and a cationic surfactant are preferable. A nonionic surfactant may be used in combination with an anionic surfactant or a cationic surfactant.

These surfactants may be used alone or in combination.

Examples of the method for dispersing resin particles in a dispersion medium in preparing the resin particle dispersion include typical dispersing methods that use a rotary shear homogenizer, a ball mill having media, a sand mill, a dyno mill, etc. Depending on the type of the resin particles, the resin particles may be dispersed in a resin particle dispersion by a phase inversion emulsification method.

Here, the phase inversion emulsification method is a method that involves dissolving a resin to be dispersed in a hydrophobic organic solvent that can dissolve the resin, adding a base to the organic continuous phase (O phase) to neutralize, and adding a water medium (W phase) to the resulting product to perform W/O-to-O/W resin conversion (what is known as phase inversion) to form a discontinuous phase and disperse the particles of the resin in a water medium.

The volume average particle diameter of the resin particles to be dispersed in the resin particle dispersion is preferably 0.01 μm or more and 1 μm or less, more preferably 0.08 μm or more and 0.8 μm or less, and yet more preferably 0.1 μm or more and 0.6 μm or less.

The volume average particle diameter of the resin particles is determined by using a particle size distribution obtained by measurement with a laser diffraction particle size distribution meter (for example, LA-700 produced by Horiba Ltd.), drawing a cumulative distribution with respect to volume from the small diameter size relative to the divided particle size ranges, and assuming the particle diameter at 50% accumulation relative to all particles as the volume-average particle diameter D50v. The volume average particle diameters of other particles in the dispersion are also measured in a similar manner.

The amount of the resin particles contained in the resin particle dispersion is, for example, preferably 5 mass % or more and 50 mass % or less and more preferably 10 mass % or more and 40 mass % or less.

A brilliant pigment dispersion and a releasing agent dispersion are prepared as with the resin particle dispersion, for example. In other words, the volume average particle diameter, the dispersion medium, the dispersing method, and the amount of particles of the particles in the resin particle dispersion equally apply to the brilliant pigment dispersed in the brilliant pigment dispersion and the releasing agent particles dispersed in the releasing agent particle dispersion.

Aggregated Particle Forming Step

Next, the resin particle dispersion, the brilliant pigment dispersion, and the releasing agent dispersion are mixed.

In the mixed dispersion, the resin particles, the brilliant pigment, and the releasing agent particles are subjected to hetero aggregation so as to form aggregated particles that have a diameter close to the target diameter of the toner particles and that contain the resin particles, the brilliant pigment, and the releasing agent particles.

Specifically, for example, aggregation involves adding an aggregating agent to the mixed dispersion, adjusting the pH of the mixed dispersion to acidic (for example, a pH of 2 or more and 5 or less), adding a dispersion stabilizer as needed, and heating the resulting mixture to the glass transition temperature of the resin particles (specifically, for example, a temperature 30° C. to 10° C. lower than the glass transition temperature of the resin particles) to aggregate the particles dispersed in the mixed dispersion and to thereby form aggregated particles.

In the aggregated particle forming step, for example, the aforementioned heating may be performed after the aggregating agent is added to the mixed dispersion at room temperature (for example, 25° C.) under stirring with a rotary shear homogenizer, the pH of the mixed dispersion is adjusted to acidic (for example, a pH of 2 or more and 5 or less), and a dispersion stabilizer is added as necessary.

Examples of the aggregating agent include a surfactant having an opposite polarity to a surfactant used as a dispersing agent added to the mixed dispersion, an inorganic metal salt, and a divalent or higher metal complex. In particular, when a metal complex is used as the aggregating agent, the amount of the surfactant used is decreased, and the charge properties are improved.

Although an additive (for example, a chelating agent) that forms a complex or a similar bond to the metal ion in the aggregating agent may be used as needed, in this exemplary embodiment, the aminocarboxylic acid compound may serve as a chelating agent.

Addition of the aminocarboxylic acid compound is not limited to a particular step. The timing of adding the aminocarboxylic acid compound may be at least one selected from the group consisting of a time when the aggregating agent is added, a time after the pH is adjusted to acidic, a time after heating, and a time during the fusing and coalescence step described below.

The amount of the aminocarboxylic acid compound added relative to a total of 100 parts by mass of the solid components (for example, the resin particles, the brilliant pigment, and the releasing agent) contained in the mixed dispersion is, for example, in the range of 0.01 parts by mass or more and 10.0 parts by mass or less, and is preferably in the range of 0.05 parts by mass or more and 5.0 parts by mass or less and more preferably in the range of 0.1 parts by mass or more and 3.0 parts by mass or less from the viewpoint of suppressing the passing-through of the toner.

Examples of the inorganic metal salt include metal salts such as calcium chloride, calcium nitrate, barium chloride, magnesium chloride, zinc chloride, aluminum chloride, and aluminum sulfate, and inorganic metal salt polymers such as polyaluminum chloride, polyaluminum hydroxide, and calcium polysulfide.

Fusing and Coalescing Step

Next, the aggregated particle dispersion containing the dispersed aggregated particles is heated to a temperature equal to or higher than the glass transition temperature of the resin particles (for example, a temperature 10° C. to 30° C. higher than the glass transition temperature of the resin particles) so as to fuse and coalesce the aggregated particles and form toner particles.

The toner particles are obtained through the aforementioned steps.

Alternatively, after obtaining the aggregated particle dispersion containing dispersed aggregated particles, a step of forming second aggregated particles by further mixing the aggregated particle dispersion and a resin particle dispersion containing dispersed resin particles and causing the resin particles to attach to the surfaces of the aggregated particles, and a step of forming toner particles having a core/shell structure by heating a second aggregated particle dispersion containing the dispersed second aggregated particles so as to fuse and coalesce the second aggregated particles may be performed to form the toner particles.

When toner particles having a core/shell structure are to be formed, the aminocarboxylic acid compound may be added in the step of forming the second aggregated particles or in the step of forming toner particles having a core/shell structure by fusing and coalescing the second aggregated particles.

Here, upon completion of the fusing and coalescing step, the toner particles formed in the solution are subjected to a known washing step, a known solid-liquid separation step, and a known drying step to obtain dry toner particles.

The washing step may involve thorough substitution washing with ion exchange water from the standpoint of chargeability. The solid-liquid separation step is not particularly limited but can involve suction filtration, pressure filtration, or the like from the viewpoint of productivity. Although the drying step is also not particularly limited, from the viewpoint of productivity, freeze drying, air drying, flow drying, vibration flow drying, or the like can be employed.

The toner according to this exemplary embodiment is produced by, for example, adding an external additive to the obtained dry toner particles and then mixing the resulting mixture. The mixing may be conducted by using a V blender, a HENSCHEL mixer, a Lodige mixer, or the like, for example. Furthermore, if necessary, coarse particles in the toner may be removed by using a vibrating sieving machine, an air sieving machine, or the like.

Electrostatic Charge Image Developer

The electrostatic charge image developer according to an exemplary embodiment contains at least the toner of this exemplary embodiment.

The electrostatic charge image developer of this exemplary embodiment may be a one-component developer that contains only the toner according to this exemplary embodiment, or may be a two-component developer that is a mixture of the toner and a carrier.

The carrier is not particularly limited, and examples thereof include known carriers. Examples of the carrier include a coated carrier obtained by covering a surface of a core formed of a magnetic powder with a coating resin; a magnetic powder-dispersed carrier in which a magnetic powder is dispersed and blended in a matrix resin; and a resin-impregnated carrier in which a porous magnetic powder is impregnated with a resin.

The magnetic powder-dispersed carrier and the resin-impregnated carrier may be a carrier constituted by cores covered with a coating resin.

Examples of the magnetic powder include magnetic metals such as iron, nickel, and cobalt, and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, an organosiloxane bond-containing straight silicone resin and modified products thereof, a fluororesin, polyester, polycarbonate, phenolic resin, and epoxy resin.

The coating resin and the matrix resin may each contain other additives such as conductive particles.

Examples of the conductive particles include particles of metals such as gold, silver, and copper, carbon black, titanium oxide, zinc oxide, tin oxide, barium sulfate, aluminum borate, and potassium titanate.

Here, an example of the method for covering the surface of the core with the coating resin is a method that involves coating the surface of the core with a coating layer-forming solution prepared by dissolving the coating resin and, as necessary, various additives in an appropriate solvent. The solvent is not particularly limited and may be selected by taking into account the coating resin to be used, application suitability, etc.

Specific examples of the resin coating method include a dipping method that involves dipping a core in a coating layer-forming solution, a spraying method that involves spraying a coating layer-forming solution onto the surface of a core, a flow bed method that involves spraying a coating layer-forming solution while the core is floated on flowing air, and a kneader coater method that involves mixing the core formed of a carrier and a coating layer-forming solution in a kneader coater and then removing the solvent.

The toner-to-carrier mixing ratio (mass ratio) of the two-component developer is preferably toner:carrier=1:100 to 30:100 and more preferably 3:100 to 20:100.

Image Forming Apparatus and Image Forming Method

An image forming apparatus and an image forming method according to this exemplary embodiment will now be described.

The image forming apparatus according to this exemplary embodiment includes an image carrying body, a charging unit that charges a surface of the image carrying body, an electrostatic charge image forming unit that forms an electrostatic charge image on the charged surface of the image carrying body, a developing unit that stores the electrostatic charge image developer and develops the electrostatic charge image on the surface of the image carrying body into a toner image by using the electrostatic charge image developer, a transfer unit that transfers the toner image on the surface of the image carrying body onto a surface of a recording medium, and a fixing unit that fixes the transferred toner image onto the surface of the recording medium. The electrostatic charge image developer of this exemplary embodiment is employed as this electrostatic charge image developer.

The image forming apparatus according to this exemplary embodiment is used to perform an image forming method (the image forming method according to this exemplary embodiment) that includes a charging step of charging a surface of an image carrying body, an electrostatic charge image forming step of forming an electrostatic charge image on the charged surface of the image carrying body, a developing step of developing the electrostatic charge image on the surface of the image carrying body into a toner image by using the electrostatic charge image developer of the exemplary embodiment, a transfer step of transferring the toner image on the surface of the image carrying body onto a surface of a recording medium, and a fixing step of fixing the transferred toner image onto the surface of the recording medium.

The image forming apparatus according to the exemplary embodiment further includes a cleaning unit that has a cleaning blade. When the image forming apparatus is of a direct transfer type that directly transfers a toner image on an image carrying body onto a recording medium, an example of the cleaning unit is a cleaning unit that has a cleaning blade that cleans the surface of the image carrying body. When the image forming apparatus is of an intermediate transfer type that first transfers a toner image on an image carrying body onto an intermediate transfer body and then transfers the toner image on the intermediate transfer body onto a surface of a recording medium, the cleaning unit may have a cleaning blade that cleans the surface of the image carrying body or a cleaning blade that cleans the surface of the intermediate transfer body.

The image forming apparatus may be a known image forming apparatus that is equipped with a charge erasing unit that irradiates the surface of the image carrying body with charge erasing light to erase charges after the toner image transfer and before charging.

In the case of the intermediate transfer type apparatus, the transfer unit is equipped with, for example, an intermediate transfer body having a surface onto which a toner image is transferred, a first transfer unit that transfers the toner image on the surface of the image carrying body onto the surface of the intermediate transfer body (first transfer), and a second transfer unit that transfers the toner image on the surface of the intermediate transfer body onto a surface of a recording medium (second transfer).

In the image forming apparatus of this exemplary embodiment, for example, a section that includes the developing unit may have a cartridge structure (process cartridge) that can be attached to and detached from the image forming apparatus. For example, the process cartridge can be equipped with a developing unit that stores the electrostatic charge image developer of the exemplary embodiment.

Hereinafter, one example of the image forming apparatus of the exemplary embodiment is described, but the image forming apparatus is not limited by the description below. The relevant parts illustrated in the drawings are described, and description of other parts is omitted.

FIG. 1 is a schematic diagram illustrating an image forming apparatus according to an exemplary embodiment.

The image forming apparatus illustrated in FIG. 1 is equipped with first to fourth image forming units 10Y, 10M, 10C, and 10K (image forming units) of an electrophotographic type configured to output images of respective colors, yellow (Y), magenta (M), cyan (C), and black (K), on the basis of the color separated image data. These image forming units (hereinafter may be simply referred to as "units") 10Y, 10M, 10C, and 10K are disposed side-by-side separated from each other by a predetermined distance in the horizontal direction. These units 10Y, 10M, 10C, and 10K may be process cartridges that can be attached to and detached from the image forming apparatus.

An intermediate transfer belt 20 that serves as an intermediate transfer body for all of the units 10Y, 10M, 10C, and 10K extends above the units 10Y, 10M, 10C, and 10K as viewed in the drawing. The intermediate transfer belt 20 is wound around a drive roll 22 and a support roll 24 that are arranged to be spaced from each other in the left-to-right direction in the drawing. The support roll 24 is in contact with the inner surface of the intermediate transfer belt 20, and the intermediate transfer belt 20 runs in a direction from the first unit 10Y toward the fourth unit 10K. A force that urges the support roll 24 to move in a direction away from the drive roll 22 is applied to the support roll 24 by a spring or the like not illustrated in the drawing so that a tension is applied to the intermediate transfer belt 20 wound around the support roll 24 and the drive roll 22. In addition, an intermediate transfer body cleaning device 30 that faces the drive roll 22 is disposed on the surface of the intermediate transfer belt 20 that carries the images. The intermediate transfer body cleaning device 30 has a cleaning blade that cleans the surface of the intermediate transfer belt 20.

Toners of four colors, yellow, magenta, cyan, and black, are stored in toner cartridges 8Y, 8M, 8C, and 8K and supplied to developing devices (developing units) 4Y, 4M, 4C, and 4K of the units 10Y, 10M, 10C, and 10K.

Since the first to fourth units 10Y, 10M, 10C, and 10K are identical in structure, only the first unit 10Y that forms a yellow image and is disposed on the upstream side of the intermediate transfer belt running direction is described as a representative example in the description below. Note that parts equivalent to those of the first unit 10Y are referred by reference signs having magenta (M), cyan (C), or black (K) added thereto instead of yellow (Y) to omit the descriptions of the second to fourth units 10M, 10C, and 10K.

The first unit 10Y has a photoreceptor 1Y that serves as an image carrying body. A charging roll (one example of the charging unit) 2Y that charges the surface of the photoreceptor 1Y to a predetermined potential, the exposing device (one example of the electrostatic charge image forming unit) 3 that forms an electrostatic charge image by exposing the charged surface with a laser beam 3Y on the basis of a color-separated image signal, a developing device (one example of the developing unit) 4Y that develops the electrostatic charge image by supplying the charged toner to the electrostatic charge image, a first transfer roll 5Y (one example of the first transfer unit) that transfers the developed toner image onto the intermediate transfer belt 20, and a photoreceptor cleaning device (one example of the cleaning unit) 6Y that removes the toner remaining on the surface of the photoreceptor 1Y after the first transfer are arranged in the order around the photoreceptor 1Y. The photoreceptor cleaning device 6Y has a cleaning blade that cleans the surface of the photoreceptor 1Y.

The first transfer roll 5Y is disposed on the inner side of the intermediate transfer belt 20 and faces the photoreceptor 1Y. Furthermore, each of the first transfer rolls 5Y, 5M, 5C, and 5K is connected to a bias power supply (not illustrated) that applies a first transfer bias. The bias power supplies control and vary the transfer biases to be applied to the respective first transfer rolls by controllers not illustrated in the drawing.

Hereinafter, the operation of forming a yellow image in the first unit 10Y is described.

First, prior to the operation, the surface of the photoreceptor 1Y is charged to a potential of −600 V to −800 V by the charging roll 2Y.

The photoreceptor 1Y is formed by forming a photosensitive layer on a conductive (for example, the volume resistivity of $1\times10^{-6}$ Ωcm or less at 20° C.) substrate. This photosensitive layer usually has high resistance (resistance of resins in general) but has a property that the part irradiated with a laser beam 3Y undergoes a change in resistivity. Thus the laser beam 3Y is output toward the charged surface of the photoreceptor 1Y through the exposing device 3 according to the yellow image data sent from a controller not illustrated in the drawing. The laser beam 3Y irradiates the photosensitive layer on the surface of the photoreceptor 1Y and thereby forms an electrostatic charge image of a yellow image pattern on the surface of the photoreceptor 1Y.

The electrostatic charge image is an image formed on the surface of the photoreceptor 1Y as a result of charging, and is a so-called negative latent image formed by the charges remaining in the portion of the photosensitive layer not irradiated with the laser beam 3Y as the charges on the surface of the photoreceptor 1Y in the portion of the photosensitive layer irradiated with the laser beam 3Y flow due to the decreased resistivity of the irradiated portion.

The electrostatic charge image on the photoreceptor 1Y is rotated to a predetermined development position as the photoreceptor 1Y is run. Then at this development position, the electrostatic charge image on the photoreceptor 1Y is visualized (developed image) into a toner image by the developing device 4Y.

For example, an electrostatic charge image developer that contains at least a yellow toner and a carrier is stored in the developing device 4Y. The yellow toner is frictionally charged by being stirred in the developing device 4Y and is carried on a developer roll (an example of a developer carrying member) by having charges of the same polarity (negative polarity) as the charges on the photoreceptor 1Y. Then as the surface of the photoreceptor 1Y passes the developing device 4Y, the yellow toner electrostatically adheres to the latent image portion from which the charges on the surface of the photoreceptor 1Y have been removed, and thus the latent image is developed with the yellow toner. The photoreceptor 1Y on which the yellow toner image has been formed is continuously run at a predetermined speed, and the toner image developed on the photoreceptor 1Y is conveyed to a predetermined first transfer position.

As the yellow toner image on the photoreceptor 1Y is conveyed to the first transfer position, a first transfer bias is applied to the first transfer roll 5Y, an electrostatic force acting from the photoreceptor 1Y toward the first transfer roll 5Y acts on the toner image, and the toner image on the photoreceptor 1Y is transferred onto the intermediate transfer belt 20. The transfer bias applied here has a polarity (+) opposite of the polarity (−) of the toner, and, for example, the transfer bias is controlled to +10 μA by a controller (not illustrated) in the first unit 10Y.

Meanwhile, the toner remaining on the photoreceptor 1Y is removed and recovered by the photoreceptor cleaning device 6Y.

The first transfer biases applied to the first transfer rolls 5M, 5C, and 5K of the second unit 10M and onward are controlled in accordance with the first unit.

As such, the intermediate transfer belt 20 onto which the yellow toner image has been transferred in the first unit 10Y is sequentially conveyed through the second to fourth units 10M, 10C, and 10K, and toner images of respective colors are superimposed on each other (multiple transfer).

The intermediate transfer belt 20 onto which the toner images of four colors have been transferred through the first to fourth units reaches a second transfer section constituted by the intermediate transfer belt 20, the support roll 24 in contact with the inner surface of the intermediate transfer belt 20, and a second transfer roll (one example of the second transfer unit) 26 disposed on the image-carrying surface-side of the intermediate transfer belt 20. Meanwhile, a supplying mechanism supplies a recording sheet (one example of the recording medium) P, at a predetermined timing, to a gap between the second transfer roll 26 and the intermediate transfer belt 20 in contact with each other, and a second transfer bias is applied to the support roll 24. The transfer bias applied at this stage has the same polarity (−)

as the polarity (−) of the toner, and an electrostatic force acting from the intermediate transfer belt 20 toward the recording sheet P acts on the toner image, and the toner image on the intermediate transfer belt is transferred onto the recording sheet P. Here, the second transfer bias is determined on the basis of the resistance detected with a resistance detection unit (not illustrated) that detects the resistance of the second transfer section, and is voltage-controlled.

Subsequently, the recording sheet P is sent into a contact section (nip section) between a pair of fixing rolls of a fixing device (one example of the fixing unit) 28, and the toner image is fixed onto the recording sheet P to form a fixed image.

Examples of the recording sheet P used to transfer the toner image include regular paper used in electrophotographic copier and printers, etc. The recording medium may be OHP sheets and the like instead of the recording sheet P.

In order to further improve the smoothness of the image surface after fixing, the surface of the recording sheet P can also be smooth, and examples of such a recording sheet P include coated paper obtained by coating the surface of regular paper with a resin or the like, and art paper used in printing.

The recording sheet P after completion of fixing of the color image is conveyed toward a discharge section, thereby terminating a series of color image forming operations.

Process Cartridge and Toner Cartridge

A process cartridge according to an exemplary embodiment will now be described.

The process cartridge of this exemplary embodiment is equipped with a developing unit that stores the electrostatic charge image developer of the exemplary embodiment and develops an electrostatic charge image on the surface of an image carrying body into a toner image by using the electrostatic charge image developer, and is detachably attachable to an image forming apparatus.

The process cartridge of this exemplary embodiment is not limited to the aforementioned structure, and may be have a structure that includes a developing device and, if needed, at least one selected from other units, for example, an image carrying body, a charging unit, an electrostatic charge image forming unit, and a transfer unit.

Hereinafter, one example of the process cartridge according to the exemplary embodiment is described, but the process cartridge is not limited by the description below. The relevant parts illustrated in the drawings are described, and description of other parts is omitted.

Figure 2:
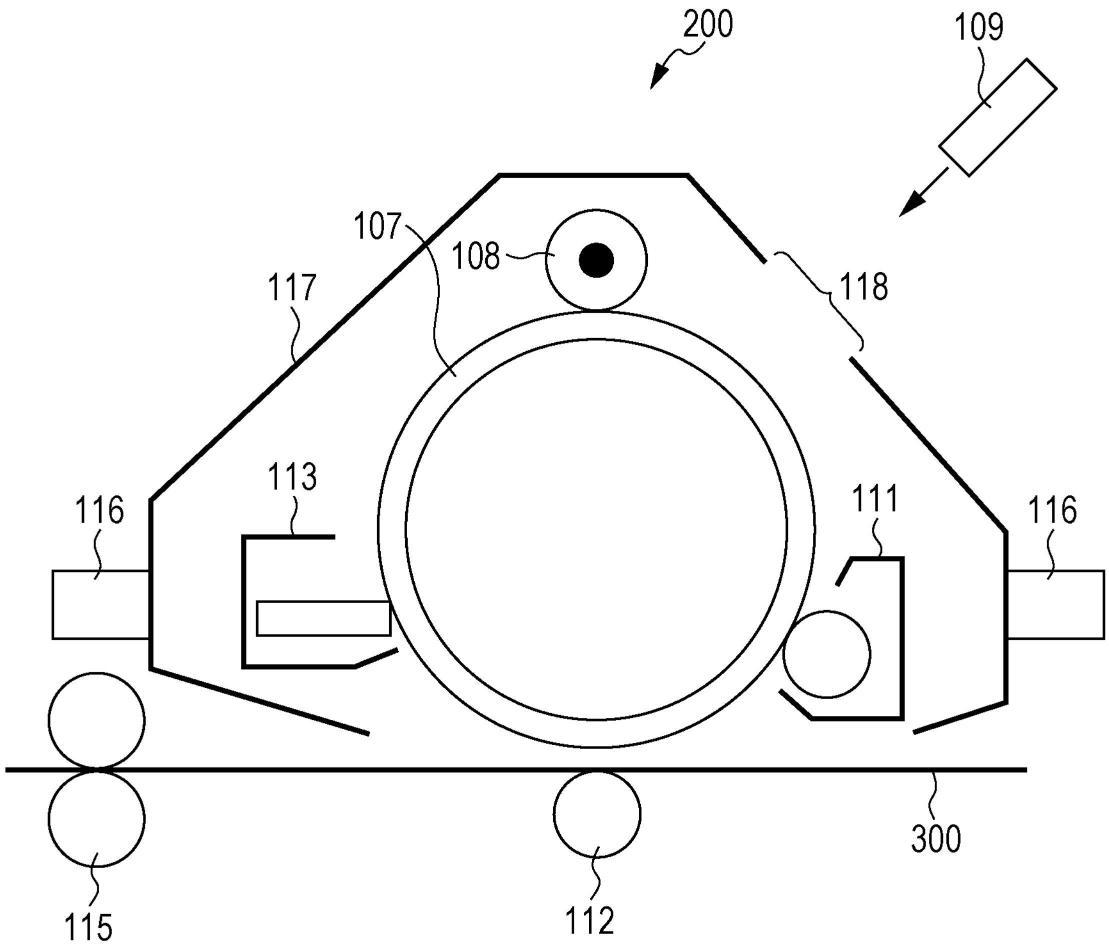
FIG. 2 is a schematic diagram illustrating a process cartridge according to an exemplary embodiment.

FIG. 2 is a schematic diagram illustrating a process cartridge of an exemplary embodiment.

A process cartridge 200 illustrated in FIG. 2 is constituted by a casing 117 equipped with a guide rail 116 and an opening 118 for exposure, the casing integrating a photoreceptor 107 (one example of the image carrying body), a charging roll 108 (one example of the charging unit) disposed around the photoreceptor 107, a developing unit 111 (one example of the developing unit), and a photoreceptor cleaning unit 113 (one example of the cleaning unit) that has a cleaning blade that cleans the surface of the photoreceptor 107 to form a cartridge.

Note that in FIG. 2, 109 denotes an exposure device (one example of the electrostatic charge image forming unit), 112 denotes a transfer device (one example of the transfer unit), 115 denotes a fixing device (one example of the fixing unit), and 300 denotes a recording sheet (one example of the recording medium).

Next, a toner cartridge according to an exemplary embodiment is described.

The toner cartridge of this exemplary embodiment stores the toner of the exemplary embodiment and is detachably attachable to an image forming apparatus. The toner cartridge stores replenishment toner to be supplied to the developing unit in the image forming apparatus.

The image forming apparatus illustrated in FIG. 1 is of a type that the toner cartridges 8Y, 8M, 8C, and 8K are detachably attachable, and the developing devices 4Y, 4M, 4C, and 4K are respectively connected to the toner cartridges corresponding to the respective developing devices (colors) through toner supply tubes. Moreover, when the toner in the toner cartridge runs low, the toner cartridge is replaced.

EXAMPLES

The examples described hereinafter do not limit the scope of the present disclosure. In the description below, the "parts" and "%" are on a mass basis unless otherwise noted.

Preparation of Respective Particle Dispersions

Preparation of Brilliant Pigment Dispersion

Preparation of Brilliant Pigment Dispersion (1)

brilliant pigment (1) (aluminum pigment, trade name: 2173EA produced by Toyo Aluminum K.K., volume-average particle diameter: 7.1 μm): 100 parts anionic surfactant (NEOGEN R produced by DKS Co., Ltd.): 1.5 parts ion exchange water: 900 parts The aforementioned materials are mixed and then dispersed for 1 hour using an emulsifying disperser (Cavitron CR1010 produced by Pacific Machinery & Engineering Co., Ltd.) to obtain a brilliant pigment dispersion (solid component concentration: 10 mass %).

Preparation of Polyester Resin Particle Dispersion

Into a reactor equipped with a stirrer, a thermometer, a condenser, and a nitrogen gas inlet tube, 80 mol parts of polyoxypropylene (2,2)-2,2-bis(4-hydroxyphenyl)propane, 10 mol parts of ethylene glycol, 10 mol parts of cyclohexanediol, 80 mol parts of terephthalic acid, 10 mol parts of isophthalic acid, and 10 mol parts of n-dodecenyl succinic acid are placed, and the inside of the reactor is purged with dry nitrogen gas. Next, 0.25 parts by mass of titanium tetrabutoxide serving as a catalyst is added relative to 100 parts by mass of the aforementioned monomer components. Under a nitrogen gas stream, the reaction is conducted at 170° C. for 3 hours while stirring, the temperature is then further elevated to 210° C. over the period of 1 hour, the inside of the reactor is depressurized to 3 kPa, and the reaction is performed at a reduced pressure for 13 hours while stirring to obtain a polyester resin.

Next, into a 3 L jacketed reactor (BJ-30N produced by ELEA) equipped with a condenser, a thermometer, a water dripping device, and an anchor blade, 200 parts by mass of a polyester resin, 100 parts by mass of methyl ethyl ketone, and 70 parts by mass of isopropyl alcohol are placed, and while the temperature is maintained at 70° C. in a water-circulating constant temperature vessel, the resulting mixture is stirred and mixed at 100 rpm to dissolve the resin. Subsequently, the stirring rotation rate is changed to 150 rpm, the water-circulating constant temperature vessel is set to 66° C., 10 parts by mass of a 10 mass % ammonia water (reagent) is added over a period of 10 minutes, and a total of 600 parts by mass of ion exchange water kept at 66° C. is added thereto dropwise at a rate of 5 parts by mass/minute to perform phase inversion and obtain an emulsion.

Into a 2 L round-bottomed flask, 600 parts of the obtained emulsion and 525 parts by mass of ion exchange water are placed, and the flask is set to an evaporator (produced by ELEA) equipped with a vacuum control unit via a trap ball. The round-bottomed flask is heated on a 60° C. bath while being rotated, and the pressure is reduced to 7 kPa while avoiding bumping to remove the solvent. The pressure is returned to normal when the amount of the recovered solvent has reached 825 parts by mass, the round-bottomed flask is cooled with water, and, as a result, a dispersion in which resin particles having a volume-average particle diameter of 170 nm are dispersed is obtained. Thereto, ion exchange water is added to obtain a polyester resin particle dispersion having a solid component concentration of 20 mass %.

Preparation of Releasing Agent Particle Dispersion paraffin wax (FNP92 produced by produced by Nippon Seiro Co., Ltd., endothermic peak onset: 81° C.): 45 parts by mass anionic surfactant (NEOGEN RK produced by DKS Co., Ltd.): 5 parts by mass ion exchange water: 200 parts by mass The aforementioned materials are mixed and heated to 95° C. The resulting mixture is dispersed by using a homogenizer (ULTRA-TURRAX T50 produced by IKA Japan). The resulting dispersion is then dispersed in a Manton-Gaulin high-pressure homogenizer (produced by Gaulin Company) to prepare a releasing agent particle dispersion (solid component concentration: 20 mass %) containing dispersed releasing agent particles. The volume average particle diameter of the releasing agent particles is 0.19 μm.

Preparation of Toner

Example 1 polyester resin particle dispersion: 450 parts brilliant pigment dispersion (1): 50 parts releasing agent particle dispersion: 22 parts nonionic surfactant (Igepal CA897): 1.40 parts The aforementioned raw materials are placed in a 2 L cylindrical stainless steel container (diameter: 30 cm) and are dispersed for 10 minutes while applying shear force by a homogenizer (ULTRA-TURRAX T50 produced by IKA Japan) at 4000 rpm. Next, 1.75 parts of a 10 mass % aqueous solution of polyaluminum chloride and 2 parts of trisodium ethylenediaminetetraacetate (trade name: EDTA.3Na produced by FUJIFILM Wako Pure Chemical Corporation) that serves as an aminocarboxylic acid compound are gradually added thereto dropwise, and the resulting mixture is dispersed for 15 minutes by setting the rotation rate of the homogenizer to 5000 rpm. As a result, a raw material dispersion is obtained.

Next, the raw material dispersion is moved to a polymerization tank equipped with a thermometer and a stirring device having a two-paddle stirring blade, heating is started by using a heating mantle while stirring at a stirring rotation rate of 200 rpm, and the resulting mixture is retained at 54° C. for 2 hours. Here, the pH of the raw material dispersion is controlled to 2.2 to 3.5 by using 0.3 N nitric acid and a 1 N aqueous sodium hydroxide solution.

Next, 30 parts of the polyester resin particle dispersion is additionally added over a period of 20 minutes, the resulting mixture is left to stand still for 15 minutes, and then 20 parts of the polyester resin particle dispersion is further added over a period of 20 minutes. The temperature is further elevated to 56° C., and the aggregated particles are adjusted by monitoring the size and state of the particles with an optical microscope and MULTISIZER II. Subsequently, the pH is increased to 8.0, and the temperature is elevated to 67.5° C. Furthermore, while the temperature is retained at 67.5° C., the pH is decreased to 6.0, heating is stopped after 1 hour, and the temperature is decreased at a rate of 1.0° C./minute for cooling. Subsequently, the resulting product is sieved through a 20 μm mesh, repeatedly washed with water, and dried in a vacuum dryer to obtain core-shell particles.

Next, after the pH is increased to 8.0, the temperature is elevated to 67.5° C. to fuse the aggregated particles, the pH is decreased to 6.0 while the temperature is retained at 67.5° C., heating is stopped after 1 hour, and the temperature is decreased at a rate of 0.1° C./minute for cooling. Subsequently, the resulting product is sieved through a 20 μm mesh, repeatedly washed with water, and dried in a vacuum dryer to obtain toner particles (1). The volume average particle diameter of the toner particles (1) is 10.5 μm, and the ratio C/D is 0.138.

In a HENSCHEL mixer, 100 parts of the obtained toner particles (1) and 1.5 parts of hydrophobic silica (RY 50 produced by Nippon Aerosil Co., Ltd.) are mixed for 2 minutes at a peripheral speed of 33 m/s. Subsequently, the resulting product is sieved through a vibrating sieve having 45 μm openings to prepare an externally added toner (1).

Example 2

Toner particles (2) and a toner (2) are obtained as in Example 1 except that 2 parts of tetrasodium ethylenediaminetetraacetate (trade name: EDTA.4Na produced by FUJIFILM Wako Pure Chemical Corporation) is used instead of 2 parts of trisodium ethylenediaminetetraacetate as the aminocarboxylic acid compound.

The volume average particle diameter of the obtained toner particles (2) is 10.4 μm, and the ratio C/D is 0.074.

Example 3

Toner particles (3) and a toner (3) are obtained as in Example 1 except that 5 parts of trisodium ethylenediaminetetraacetate (trade name: EDTA.3Na produced by FUJIFILM Wako Pure Chemical Corporation) is used instead of 2 parts of trisodium ethylenediaminetetraacetate as the aminocarboxylic acid compound.

The volume average particle diameter of the obtained toner particles (3) is 10.6 μm, and the ratio C/D is 0.482.

Example 4

Toner particles (4) and a toner (4) are obtained as in Example 1 except that 0.4 parts of trisodium ethylenediaminetetraacetate (trade name: EDTA.3Na produced by FUJIFILM Wako Pure Chemical Corporation) is used instead of 2 parts of trisodium ethylenediaminetetraacetate as the aminocarboxylic acid compound.

The volume average particle diameter of the obtained toner particles (4) is 10.1 μm, and the ratio C/D is 0.153.

Example 5

Toner particles (5) and a toner (5) are obtained as in Example 1 except that 10 parts of trisodium ethylenediaminetetraacetate (trade name: EDTA.3Na produced by FUJIFILM Wako Pure Chemical Corporation) is used instead of 2 parts of trisodium ethylenediaminetetraacetate as the aminocarboxylic acid compound.

The volume average particle diameter of the obtained toner particles (5) is 10.9 μm, and the ratio C/D is 0.204.

Example 6

Toner particles (6) and a toner (6) are obtained as in Example 1 except that 5 parts of trisodium ethylenediaminetetraacetate (trade name: EDTA.3Na produced by FUJIFILM Wako Pure Chemical Corporation) is used instead of 2 parts of trisodium ethylenediaminetetraacetate as the aminocarboxylic acid compound.

The volume average particle diameter of the obtained toner particles (6) is 10.4 μm, and the ratio C/D is 0.257.

Example 7

Toner particles (7) and a toner (7) are obtained as in Example 1 except that 2 parts of trisodium hydroxyethylethylenediaminetriacetate (trade name: HEDTA.3Na produced by FUJIFILM Wako Pure Chemical Corporation) is used instead of 2 parts of trisodium ethylenediaminetetraacetate as the aminocarboxylic acid compound.

The volume average particle diameter of the obtained toner particles (7) is 10.2 μm, and the ratio C/D is 0.184.

Example 8

Toner particles (8) and a toner (8) are obtained as in Example 1 except that 2 parts of trisodium diethylenetriaminepentaacetate (trade name: DTPA.3Na produced by FUJIFILM Wako Pure Chemical Corporation) is used instead of 2 parts of trisodium ethylenediaminetetraacetate as the aminocarboxylic acid compound.

The volume average particle diameter of the obtained toner particles (8) is 10.6 μm, and the ratio C/D is 0.302.

Example 9

Toner particles (9) and a toner (9) are obtained as in Example 1 except that 2 parts of 1,4,7,10-tetrazacyclododecane-1,4,7,10-tetrayltetraacetate (trade name: DOTA produced by FUJIFILM Wako Pure Chemical Corporation) is used instead of 2 parts of trisodium ethylenediaminetetraacetate as the aminocarboxylic acid compound.

The volume average particle diameter of the obtained toner particles (9) is 11.0 μm, and the ratio C/D is 0.118.

Example 10

Toner particles (10) and a toner (10) are obtained as in Example 1 except that 2 parts of disodium ethylenediaminetetraacetate (trade name: EDTA.2Na produced by FUJIFILM Wako Pure Chemical Corporation) is used instead of 2 parts of trisodium ethylenediaminetetraacetate as the aminocarboxylic acid compound.

The volume average particle diameter of the obtained toner particles (10) is 9.9 μm, and the ratio C/D is 0.098.

Example 11

Toner particles (11) and a toner (11) are obtained as in Example 1 except that 2 parts of disodium ethylenediaminetetraacetate (trade name: EDTA.2Na produced by FUJIFILM Wako Pure Chemical Corporation) is used instead of 2 parts of trisodium ethylenediaminetetraacetate as the aminocarboxylic acid compound.

The volume average particle diameter of the obtained toner particles (11) is 10.3 μm, and the ratio C/D is 0.354.

Comparative Example 1

Toner particles (C1) and a toner (C1) are obtained as in Example 1 except that the aminocarboxylic acid compound is not added.

The volume average particle diameter of the obtained toner particles (Cl) is 10.3 μm, and the ratio C/D is 0.164.

Example 12

Toner particles (12) and a toner (12) are obtained as in Example 1 except that 0.1 parts of trisodium ethylenediaminetetraacetate (trade name: EDTA.3Na produced by FUJIFILM Wako Pure Chemical Corporation) is used instead of 2 parts of trisodium ethylenediaminetetraacetate as the aminocarboxylic acid compound.

The volume average particle diameter of the obtained toner particles (12) is 10.5 μm, and the ratio C/D is 0.170.

Example 13

Toner particles (13) and a toner (13) are obtained as in Example 1 except that 20 parts of trisodium ethylenediaminetetraacetate (trade name: EDTA.3Na produced by FUJIFILM Wako Pure Chemical Corporation) is used instead of 2 parts of trisodium ethylenediaminetetraacetate as the aminocarboxylic acid compound.

The volume average particle diameter of the obtained toner particles (13) is 10.2 μm, and the ratio C/D is 0.201.

Example 14

Toner particles (14) and a toner (14) are obtained as in Example 1 except that 2 parts of trisodium ethylenediaminetetraacetate (trade name: EDTA.3Na produced by FUJIFILM Wako Pure Chemical Corporation) is used instead of 2 parts of trisodium ethylenediaminetetraacetate as the aminocarboxylic acid compound.

The volume average particle diameter of the obtained toner particles (14) is 10.0 μm, and the ratio C/D is 0.008.

Example 15

Toner particles (15) and a toner (15) are obtained as in Example 1 except that 2 parts of trisodium ethylenediaminetetraacetate (trade name: EDTA.3Na produced by FUJIFILM Wako Pure Chemical Corporation) is used instead of 2 parts of trisodium ethylenediaminetetraacetate as the aminocarboxylic acid compound.

The volume average particle diameter of the obtained toner particles (15) is 10.6 μm, and the ratio C/D is 0.754.

Example 16

Toner particles (16) and a toner (16) are obtained as in Example 1 except that 2 parts of L-asparagine monohydrate (trade name: L-asparagine monohydrate produced by FUJIFILM Wako Pure Chemical Corporation) is used instead of 2 parts of trisodium ethylenediaminetetraacetate as the aminocarboxylic acid compound.

The volume average particle diameter of the obtained toner particles (16) is 10.8 μm, and the ratio C/D is 0.380.

Example 17

Toner particles (17) and a toner (17) are obtained as in Example 1 except that 2 parts of triethylenetetraminehexaacetic acid (trade name: TTHA produced by FUJIFILM Wako Pure Chemical Corporation) is used instead of 2 parts of trisodium ethylenediaminetetraacetate as the aminocarboxylic acid compound.

The volume average particle diameter of the obtained toner particles (17) is 10.3 μm, and the ratio C/D is 0.172.

Example 18

Toner particles (18) and a toner (18) are obtained as in Example 1 except that 2 parts of disodium nitrilotriacetate (trade name: disodium nitrilotriacetate produced by FUJIFILM Wako Pure Chemical Corporation) is used instead of 2 parts of trisodium ethylenediaminetetraacetate as the aminocarboxylic acid compound.

The volume average particle diameter of the obtained toner particles (18) is 10.5 μm, and the ratio C/D is 0.198.

Example 19

Toner particles (19) and a toner (19) are obtained as in Example 1 except that 2 parts of tetrasodium 3-hydroxy-2, 2'-iminodisuccinate (trade name: HIDS produced by FUJIFILM Wako Pure Chemical Corporation) is used instead of 2 parts of trisodium ethylenediaminetetraacetate as the aminocarboxylic acid compound.

The volume average particle diameter of the obtained toner particles (19) is 10.3 μm, and the ratio C/D is 0.187.

Comparative Example 2

Toner particles (C2) and a toner (C2) are obtained as in Example 1 except that 2 parts of trisodium citrate (trade name: trisodium citrate produced by FUJIFILM Wako Pure Chemical Corporation) is used instead of the aminocarboxylic acid compound.

The volume average particle diameter of the obtained toner particles (C2) is 10.5 μm, and the ratio C/D is 0.216.

Example 20

Toner particles (20) and a toner (20) are obtained as in Example 1 except that 2 parts of N-(2,6-dimethylphenylcarbamoylmethyl)iminodiacetic acid (trade name: N-2,6-dimethylphenylcarbamoylmethyl)iminodiacetic acid produced by FUJIFILM Wako Pure Chemical Corporation) is used instead of 2 parts of trisodium ethylenediaminetetraacetate as the aminocarboxylic acid compound.

The volume average particle diameter of the obtained toner particles (20) is 10.3 μm, and the ratio C/D is 0.214.

The number of carboxy groups, the number of amino groups, and the pH of the aminocarboxylic acid compounds and trisodium citrate used in Examples and Comparative Examples described above are indicated in Table.

The contents (ppm) of the aminocarboxylic acid compounds and trisodium citrate contained in the toner particles obtained in Examples and Comparative Examples described above as measured by the aforementioned method are indicated in Table.

[Evaluation]

Preparation of Carrier

Into a pressure kneader, 100 parts by mass of ferrite particles (produced by Powdertech Co., Ltd., average particle diameter: 50 μm), 1.5 parts by mass of a polymethyl methacrylate resin (produced by Mitsubishi Chemical Corporation, weight average molecular weight: 95,000, the ratio of the components having a weight-average molecular weight of 10,000 or less: 5 mass %), and 500 parts by mass of toluene are placed, the resulting mixture is stirred and mixed at room temperature (25° C.) for 15 minutes, and then the temperature is elevated to 70° C. while stirring and depressurizing so as to distill away toluene. The resulting mixture is then cooled and classified through a 105 μm screen to obtain a resin-coated ferrite carrier.

Preparation of Developer

The obtained toner and the resin coated-ferrite carrier are mixed to prepare a developer having a toner concentration of 7 mass %.

Evaluation of Passing-Through of Toner

The obtained developer is loaded into a developing device of a commercially available image forming apparatus having an intermediate transfer belt (Docu Centre III C7600 produced by Fuji Xerox Co., Ltd.).

In a 28° C., 85% RH environment, an image having an image density of 20% is formed on regular paper (trade name: P paper A4 produced by Fuji Xerox Co., Ltd.) for 5000 pv (pv=the number of sheets on which the image is formed (print volume)), and then a full-sheet halftone 50% image is formed on one sheet of paper.

An adhesive cellophane tape is applied to the surface of the intermediate transfer belt after the formation of the full-sheet halftone 50% image and then peeled. The adhesive cellophane tape is applied again to a sheet of white paper to confirm the toner on that white paper and observe the extent of the passing-through of the toner. Then the extent of the passing-through of the residual toner is evaluated according to the following standard. The results are indicated in Table.

A: No passing-through of the toner is observed.

B: Slight passing-through of the toner is observed, but the extent thereof is practically acceptable.

C: Some passing-through of the toner is observed, but the extent thereof is practically acceptable.

D: Passing-through of the toner is observed in some parts, but the extent thereof is practically acceptable.

E: Passing-through of the toner is observed throughout the adhesive cellophane tape, and the extent thereof is not suitable for practical use.

Evaluation of Fogging

The obtained developer is loaded into a developing device of a commercially available image forming apparatus having an intermediate transfer belt (Docu Centre III C7600 produced by Fuji Xerox Co., Ltd.).

Evaluation of fogging involves evaluating fogging that occurs when, in a 28° C., 85% RH environment, an image having an image density of 1% is continuously formed on 30 sheets of regular paper (trade name: P paper A4 produced by Fuji Xerox Co., Ltd.).

A: Fogging is not observed in any of the thirty sheets.

B: Fogging is vaguely observed in one of the thirty sheets, but the extent thereof is practically acceptable.

C: Fogging is vaguely observed in several of the thirty sheets, but the extent thereof is practically acceptable.

D: Fogging is clearly observed in several of the thirty sheets, and the extent thereof is practically unacceptable.

Evaluation of Brilliance

The obtained developer is loaded into a developing device of a commercially available image forming apparatus having an intermediate transfer belt (Docu Centre III C7600 produced by Fuji Xerox Co., Ltd.).

In a 25° C., 50% RH environment, a solid image having a toner coating amount of 4.5 $mg/cm^2$ is formed on a recording sheet (OK TopKote+ paper produced by Oji Paper Co., Ltd.) at a fixing temperature of 190° C. and a fixing pressure of 4.0 $kg/cm^2$.

The brilliance of the obtained solid image is evaluated by visual observation under a lighting for color observation (natural daylight lighting) in accordance with JIS K 5600-4-3:1999 "Testing methods for paints—Part 4: Visual characteristics of film—Section 3: Visual comparison of the colour of paints". In the evaluation, the graininess (the glittering effect of brilliance) and the optical effect (change in hue depending on the viewing angle) are evaluated, and the ratings are as follows.

5: The graininess and the optical effect are in harmony.
4: Slight graininess and optical effect are observed, but the extent thereof is practically acceptable.
3: The sensation is normal and is practically acceptable.
2: There is a vaguely blurred sensation, but the extent thereof is practically acceptable.
1: The graininess and the optical effect are lacking, and the sample is not suitable for practical applications.

TABLE

| | | Aminocarboxylic acid compound etc. | | | | Evaluation | | |
|---|---|---|---|---|---|---|---|---|
| Examples | Toner | Number of carboxy groups | Number of amino groups | pH | Content (ppm) | Passing-through of toner | Fogging | Brilliance |
| Example 1 | (1) | 4 | 2 | 7.4 | 34 | A | A | 5 |
| Example 2 | (2) | 4 | 2 | 9.2 | 42 | C | B | 2 |
| Example 3 | (3) | 4 | 2 | 7.3 | 51 | A | A | 3 |
| Example 4 | (4) | 4 | 2 | 7.3 | 1.3 | B | A | 4 |
| Example 5 | (5) | 4 | 2 | 6.7 | 91 | A | B | 3 |
| Example 6 | (6) | 4 | 2 | 7.9 | 51 | A | B | 3 |
| Example 7 | (7) | 3 | 2 | 11.5 | 40 | C | B | 2 |
| Example 8 | (8) | 5 | 3 | 7.5 | 39 | A | B | 2 |
| Example 9 | (9) | 4 | 4 | 4.3 | 30 | A | A | 4 |
| Example 10 | (10) | 4 | 2 | 5.1 | 35 | A | C | 3 |
| Example 11 | (11) | 4 | 2 | 4.4 | 44 | A | C | 2 |
| Comparative Example 1 | (C1) | — | — | — | — | E | C | 4 |
| Example 12 | (12) | 4 | 2 | 7.1 | 0.4 | D | B | 4 |
| Example 13 | (13) | 4 | 2 | 7.4 | 124 | A | D | 3 |
| Example 14 | (14) | 4 | 2 | 7.2 | 21 | A | D | 5 |
| Example 15 | (15) | 4 | 2 | 7.0 | 13 | A | C | 1 |
| Example 16 | (16) | 1 | 2 | 5.5 | 38 | D | A | 3 |
| Example 17 | (17) | 6 | 4 | 2.5 | 11 | A | D | 2 |
| Example 18 | (18) | 3 | 1 | 6.5 | 19 | D | A | 4 |
| Example 19 | (20) | 4 | 1 | 9.1 | 23 | D | B | 2 |
| Comparative Example 2 | (C2) | 3 | 0 | 6.9 | 42 | E | B | 4 |
| Example 20 | (20) | 2 | 2 | 8.0 | 9 | D | A | 4 |

The aforementioned results indicate that the toners of Examples suppress the passing-through of the toner compared to the toners of Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A toner for developing an electrostatic charge image, the toner comprising:

flat-shaped toner particles that include:

a non-vinyl polyester binder resin that is present in an amount in a range of from 50 mass % to 90 mass % relative to the mass of the entire toner particles;

a releasing agent;

a brilliant pigment that is a flat-shaped metal pigment; and an aminocarboxylic acid compound that is contained in an amount of 1 ppm or more and 100 ppm or less relative to an entirety of the toner for developing an electrostatic charge image.

2. The toner for developing an electrostatic charge image according to claim 1, wherein the aminocarboxylic acid compound has 3 or more and 5 or less carboxy groups, and has 2 or more and 4 or less amino groups.

3. The toner for developing an electrostatic charge image according to claim 2, wherein the aminocarboxylic acid compound has 4 or more and 5 or less carboxy groups.

4. The toner for developing an electrostatic charge image according to claim 2, wherein the aminocarboxylic acid compound has 2 or more and 3 or less amino groups.

5. The toner for developing an electrostatic charge image according to claim 3, wherein the aminocarboxylic acid compound has 2 or more and 3 or less amino groups.

6. The toner for developing an electrostatic charge image according to claim 1, wherein the aminocarboxylic acid compound is contained in an amount of 30 ppm or more and 60 ppm or less relative to the entirety of the toner for developing an electrostatic charge image.

7. The toner for developing an electrostatic charge image according to claim 1, wherein the aminocarboxylic acid compound has a pH of 4 or more and 12 or less.

8. The toner for developing an electrostatic charge image according to claim 7, wherein the aminocarboxylic acid compound has a pH of 5 or more and 8 or less.

9. The toner for developing an electrostatic charge image according to claim 1, wherein the toner particles have a ratio C/D of 0.01 or more and 0.50 or less, where C represents an average maximum thickness of the toner particles and D represents an average equivalent circle diameter of the toner particles.

10. An electrostatic charge image developer comprising the toner for developing an electrostatic charge image according to claim 1.

11. A toner cartridge detachably attachable to an image forming apparatus, comprising the toner for developing an electrostatic charge image according to claim 1.

12. A process cartridge detachably attachable to an image forming apparatus, comprising a developing unit that contains the electrostatic charge image developer according to claim 10 and develops an electrostatic charge image on a surface of an image carrying body into a toner image by using the electrostatic charge image developer.

13. An image forming apparatus comprising:
- an image carrying body;
- a charging unit that charges a surface of the image carrying body;
- an electrostatic charge image forming unit that forms an electrostatic charge image on the charged surface of the image carrying body;
- a developing unit that contains the electrostatic charge image developer according to claim 10 and develops the formed electrostatic charge image on the surface of the image carrying body into a toner image by using the electrostatic charge image developer;
- an intermediate transfer body that has a surface that receives transfer of the toner image;
- a first transfer unit that first-transfers the formed toner image on the surface of the image carrying body onto the surface of the intermediate transfer body;
- a second transfer unit that second-transfers the transferred toner image on the surface of the intermediate transfer body onto a surface of a recording medium;
- a cleaning unit that has a cleaning blade that cleans the surface of the intermediate transfer body; and
- a fixing unit that fixes the second-transferred toner image on the surface of the recording medium.

14. An image forming apparatus comprising:
- an image carrying body;
- a charging unit that charges a surface of the image carrying body;
- an electrostatic charge image forming unit that forms an electrostatic charge image on the charged surface of the image carrying body;
- a developing unit that contains the electrostatic charge image developer according to claim 10 and develops the formed electrostatic charge image on the surface of the image carrying body into a toner image by using the electrostatic charge image developer;
- a transfer unit that transfers the formed toner image on the surface of the image carrying body onto a surface of a recording medium;
- a cleaning unit that has a cleaning blade that cleans the surface of the image carrying body; and
- a fixing unit that fixes the transferred toner image on the surface of the recording medium.

15. A toner for developing an electrostatic charge image, the toner comprising:
- flat-shaped toner particles that include:
  - a non-vinyl polyester binder resin that is present in an amount in a range of from 50 mass % to 90 mass % relative to the mass of the entire toner particles;
  - a releasing agent;
  - a brilliant pigment that is a flat-shaped metal pigment; and
  - an aminocarboxylic acid compound that (i) has 3 or more and 5 or less carboxy groups; (ii) has 2 or more and 4 or less amino groups; (iii) as a pH of 5 or more and 8 or less; and (iv) is contained in an amount of 1 ppm or more and 100 ppm or less relative to an entirety of the toner for developing an electrostatic charge image.

16. The toner for developing an electrostatic charge image according to claim 1, wherein the flat-shaped toner particles includes no binder resin other than the non-vinyl polyester binder resin.

17. The toner for developing an electrostatic charge image according to claim 15, wherein the flat-shaped toner particles includes no binder resin other than the non-vinyl polyester binder resin.

18. The toner for developing an electrostatic charge image according to claim 1, wherein the non-vinyl polyester binder resin has a glass transition temperature in a range of from 50° C. to 80° C.

19. The toner for developing an electrostatic charge image according to claim 18, wherein the non-vinyl polyester binder resin is a polycondensation product of polycarboxylic acid and polyhydric alcohol.

* * * * *